United States Patent [19]
Henry

[11] Patent Number: 6,083,427
[45] Date of Patent: Jul. 4, 2000

[54] STABILIZED MATRIX FOR PHOTOCHROMIC ARTICLES

[75] Inventor: David Henry, Morigny Champigny, France

[73] Assignee: Corning Incorporated, Corning, N.Y.

[21] Appl. No.: 09/230,006

[22] PCT Filed: Jun. 26, 1997

[86] PCT No.: PCT/US97/12759

§ 371 Date: Jan. 13, 1999

§ 102(e) Date: Jan. 13, 1999

[87] PCT Pub. No.: WO98/03890

PCT Pub. Date: Jan. 29, 1998

[30] Foreign Application Priority Data

Jul. 23, 1996 [FR] France .................................. 96 09236

[51] Int. Cl.[7] .............................. G02B 5/23; C08G 18/08; B32B 37/00
[52] U.S. Cl. .............................. 252/586; 528/48; 528/52; 428/412; 428/423.1
[58] Field of Search ............................... 252/586; 528/48, 528/52; 428/412, 423.1

[56] References Cited

U.S. PATENT DOCUMENTS

| | | | |
|---|---|---|---|
| 5,391,327 | 2/1995 | Ligas et al. | 252/586 |
| 5,498,686 | 3/1996 | Effer et al. | 528/76 |
| 5,708,064 | 1/1998 | Coleman et al. | 252/586 |
| 5,763,511 | 6/1998 | Chan et al. | 252/586 |

FOREIGN PATENT DOCUMENTS

95/10790  4/1995  WIPO .

*Primary Examiner*—Philip Tucker
*Attorney, Agent, or Firm*—Angela N. Nwaneri; Peter Rogaldskyj

[57] ABSTRACT

A stabilizing matrix for photochromic compounds is disclosed in which a functionalized hindered amine light stabilizer capable of reacting with an isocyanate group is linked to the polymer backbone by a covalent bond to form a grafted structure. The resulting matrix is characterized by having a stabilizing effect on the photochromic dye, in particular, spirooxazines. Preferred specific articles of the invention are photochromic organic lenses.

18 Claims, No Drawings

STABILIZED MATRIX FOR PHOTOCHROMIC ARTICLES

BACKGROUND OF THE INVENTION

The invention relates to a photochromic article formed by applying a novel stabilizing polymeric matrix on a transparent substrate, which matrix includes a photochromic dye and an agent that stabilizes the dye against light being grafted onto the matrix.

Organic photochromic materials are well known. They comprise a polymer matrix including a photochromic dye. One drawback of most of these materials is that their photochromic properties degrade too rapidly so that it is not possible to manufacture commercially usable articles from them, because their lifespan is insufficient. This degradation of the photochromic properties is due to a fatigue of the photochromic dye caused by light. Thus, there has been a need for many years for stable organic photochromic materials.

Several methods have been suggested for producing such a product. For example, it has been suggested to incorporate photochromic dyes into polymerizable compositions in order to impart photochromic properties to the resulting polymer. The difficulty in this approach lies in the fact that the photochromic dyes are sometimes destroyed during the polymerization. Recently, several novel suggestions have been disclosed for alleviating such problems. Examples of such solutions are disclosed in co-pending, co-assigned U.S. provisional patent application Ser. Nos. 60/000,829, 60/001,677, 60/004,492, and 60/011,429.

EP A 0195898 and its equivalent U.S. Pat. No. 4,720,356 describe the incorporation in the composition of the polymerizable matrix of a hindered amine as light stabilizer routinely called HALS. (Hindered, in this sense relates to steric hindrance.) Although the addition of a HALS to the polymerizable matrix composition considerably improves the resistance to fatigue of the photochromic dye, more durable photochromic materials are still needed.

The object of the invention is to satisfy this need.

SUMMARY OF THE INVENTION

Briefly, the invention is based on the idea of chemically combining a hindered amine to the macromolecules of a polymer matrix, rather than simply incorporating it in this matrix as in the above-mentioned patents.

The invention relates to a photochromic article characterized in that it comprises a transparent substrate bearing at least one coating made of a polymer matrix including a photochromic dye and, as agent for stabilizing said dye against exposure to light, a hindered amine that is chemically bound to the macromolecules of the polymer matrix.

In particular, the invention relates to a stabilizing matrix for photochromic compounds, which matrix contains a functionalized hindered amine light stabilizer capable of reacting with an isocyanate group, and is linked to the polymer backbone by a covalent bond to form a stable functionalized (i.e., grafted) structure.

According to a preferred embodiment, the polymer matrix is a polyurethane. In this embodiment, the invention relates to a photochromic organic material comprising a plastic substrate having formed thereon, a coating of a matrix composition, the composition being a polyurethane formulation comprising an isocyanate, a polyol, a hindered amine light stabilizer, and a photochromic dye.

The invention also relates to a polymerizable coating composition that forms photochromically stabilized polyurethane, useful for the production of the photochromic article of the invention, comprising at least one polyisocyanate and at least one polyol, the polyisocyanate-polyol pair being chosen in such a manner that one of them presents one functional group more than the other; a photochromic dye preferably of the class of spiroxazines; a light stabilizer of the hindered amine-type, which amine comprises a reactive function with an isocyanate group; and optionally, a catalyst.

The term polyisocyanate is understood to denote a compound comprising two isocyanate groups or more. Similarly, the term polyol is understood to denote a compound comprising two hydroxyl groups or more, with the condition that the polyisocyanate and the polyol used comprise in total at least five isocyanate and hydroxyl groups. That is, the polyisocyanate must comprise at least three isocyanate groups when the polyol is a diol, and the polyol must comprise at least three hydroxyl groups when the polyisocyanate is a diisocyanate.

For the purposes of the invention, the term polyol includes the polythiols.

Preferably, the hindered amine comprises a reactive hydroxyl group, the polyisocyanate comprises three isocyanate groups and the polyol is a diol.

In another aspect, the invention relates to a method of making a photochromic organic article according to the invention, by:

a) providing a transparent plastic substrate;

b) applying a layer of a polymerizable composition of polyurethane matrix according to the invention on at least one surface of the substrate, and c) polymerizing the layer into a coating of photochromic polyurethane.

Preferably, the matrix comprises polyisocyanate, polyol, a hindered amine light stabilizer having a group which is capable of reacting with isocyanate to form a urethane function, a spirooxazine, a catalyst, and a solvent.

The thickness of the coating may be in the range of 5–150, preferably, 10–100 microns.

DETAILED DESCRIPTION OF THE INVENTION

Photochromic materials, in particular photochromic materials useful for ophthalmic applications such as lenses require good stability against photodegradation. Thus, such materials must be resistance to fatigue substantially over the useful life of the lens. One useful class of photochromic dyes useful for photochromic ophthalmic applications is spirooxazines. As stated earlier, one difficulty in making photochromic articles is the tendency of the photochromic dyes to lose photochromic activity in a polymer matrix with time. One class of stabilizers which have been suggested for such application is a hindered amine light stabilizer, or HALS. Particularly for ophthalmic applications, it is, desirable to provide lenses having relatively thin photochromic coatings.

It is known that in order to produce a thin coating having good photochromic response it is necessary to obtain a spirooxazine surface coverage of about 0.35 mg/cm$^2$. J. C. Crano et al., *Applied Photochromic Polymer Systems*, edited by C. B. McArdle (Chapman and Hall, NY: 1992), p. 68. It is also known that in order to be effective, HALS concentrations needed to obtain good photochromic response are in the neighborhood of about twice the coverage needed for spirooxazine. Nory Y. C. Chu, *Optical Materials Technology for Energy Efficiency and Solar Energy Conversion VII*, Spie. Vol. 1016 (1988), p.152. As a result, for low thickness coatings, the spirooxazirne and HALS concentrations necessary for good photochromic response becomes impractically high. Such high concentrations are impractical because the solubility of spirooxazine and HALS in the matrix is relatively low. In addition, the physical and chemical properties of the matrix is significantly altered at such high concentrations.

I have found a class of hindered amine light stabilizers which alleviate the above problems. In particular, I have found that hindered amine light stabilizers having reactive functionalities are useful for the practice of the present invention. One particularly useful example of such functionalized HALS is tetramethyl piperidinol (available from ALDRICH), which contains an OH group which can react with an isocyanate to produce a urethane function. Specifically, the —OH functionalized HALS is incorporated into a polyurethane formulation consisting of a mixture of polyisocyanate and polyol. Without intending to be bound by theory, I believe that the HALS reacts with the isocyanate groups and in the process, is linked to the polymer backbone by a covalent bond to form a grafted structure.

The resulting matrix containing the grafted structure is highly stable and the HALS becomes integral to the matrix. The matrix is stabilized because the grafting prevents any aggregation or crystallization of the HALS. Also, the concentration of the grafted HALS is higher than with conventional free molecule HALS such as TINUVIN 770 for example (available from CIBA-GEIGY).

The composition of the coating formulation is, in wt %: 30–55 wt % of polyisocyanate, 20–35 wt % of polyol, 2–10 wt % of reactive stabilizer with added functional group, 0.1–2 wt % of photochromic dye, 0–2 wt % of catalyst and 5–30 wt % of solvent. A proportion of 0.1–1 wt % of photochromic dye is preferred. After curing (i.e., after polymerization), the composition of the coating in weight percent is preferably: 30–60 polyisocyanate, 20–35 polyol, 2–10 tetramethyl piperidinol, and 0.1–1.0 photochromic dye.

Nonlimiting examples of polyisocyanates that can be used in the invention are: meta-and para-xylylene diisocyanate, hexamethylene diisocyanate, isophorone disocyanate, 4,4'-diphenyldiisocyanate, 4,4'-diphenylmethane diisocyanate, 4,4'-dicyclohexylmethane diisocyanate and trimethyl-1,6-diisocyanatohexine.

Nonlimiting examples of diols or polyols include: ethylene glycol, propylene glycol, 1,4-berbinediol, 1,6-hexanediol, 1,8-octanediol and similar compounds, cyclohexane dimethanol, glycol polyalkoyl ethers with a molecular weight of less than 10,000 (for example, polyethylene glycol, polypropylene glycol, etc.), polyester diols; (for example, polycaprolactonediol), aromatic diols, polycarbonate diols, glycerol, trimethylolpropane, hexanetriol, pentaerythritol, polythiols, etc.

All the photochromic dyes of the spiroxazine type can be suitable. The published literature on this subject is very abundant. See, for example, U.S. Pat. Nos. 3,562,172, 4,634,767, 4,637,698, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and EP A 0,508,219, 0,232, 295 and 0,171,909, among others, as well as the books:

Photochromism, G. Brown, Editor, Techniques of Chemistry, Wiley Interscience, Vol. III (1971), Chapter III, pp. 45–294, R. C. Bertelson Photochromism—Molecules & Systems, H. Dürr H. Bouas-Laurent, Editor, Elsevier (1990), Chapter 8: Spiropyrans, pp. 314–455, R. Guglielmetti Optional catalysts include all the catalysts which are conventionally used in the polyurethane formulations. Dibutyltin dilaurate and stannous octoate are used most routinely.

The following nonlimiting examples are given for the purpose of illustrating the invention.

EXAMPLES

1. Coating Composition (Matrix): Example 1 represents the invention, while Examples 2 and 3 are comparative compositions showing respectively, a formulation using a non-functionalized HALS, and without a stabilizer.

|  | Ex.1 | Ex.2 | Ex.3 |
|---|---|---|---|
|  |  | weight (g) |  |
| Polyisocyanate[1] | 9.42 | 9.42 | 9.42 |
| Polyol[2] | 5.30 | 5.30 | 5.30 |
| Stabilizer[3] | — | 1.75 | — |
| Reactive Stabilizer[4] | 1.15 | — | — |
| Photochromic Dye[5] | 0.15 | 0.15 | 0.15 |
| Catalyst[6] | 0.02 | 0.02 | 0.02 |
| Solvent[7] | 4.00 | 4.00 | 4.00 |

[1]CYTHANE 3160 (an aliphatic polyisocyanate resin available from AMERICAN CYANAMID COMPANY)
[2]POLYCAPROLACTONE DIOL MW = 530 available from ALDRICH
[3]TINUVIN 770 DF (HALS) available from CIBA-GEIGY
[4]TETRAMETHYL PIPERIDINOL available from ALDRICH
[5]VARICROL BLUE D (a spirooxazine photochromic dye available from ENICHEM)
[6]DIBUTYLTIN DILAURATE available from ALDRICH
[7]TETRAHYDROFURAN available from ALDRICH 2. A coating of about 100 microns of each of the above three phototochromic formulations were applied to the surface of a plano lens made of CR39$^R$ (a polybis (allylcarbonate) of diethylene glycol available from PPG Industries), and cured at 50° C. for 1 hour, and 130° C. for an additional hour.

After curing, the transmittance of each coated sample was measured. All three samples showed very high transmittances (>90%). Also, each sample had acceptable optical quality.

3. In the following experiment, each of the three coated samples was exposed for 240 hours to a Xenon lamp source (E=150,000, Lx/I=850 W/m$^2$), at a temperature of about 40° C. The transmittance of each sample was remeasured after 72, 120, and 240 hours. The results are summarized below:

|  | Sample 1 | | Sample 2 | | Sample 3 | |
|---|---|---|---|---|---|---|
|  | Transmittance (%) | | | | | |
| Time (hrs.) | $T_0$ | $T_x$ | $T_0$ | $T_x$ | $T_0$ | $T_x$ |
| 0 | 90 | 2.5 | 90 | 2.5 | 90 | 2.5 |
| 72 | 90 | 2.5 | 90 | 10 | 10 | — |
| 120 | 90 | 10 | 90 | 30 | 10 | — |
| 240 | 90 | 50 | 90 | 90 | 10 | — |

$T_0$ % Transmittance in the inactivated state (i.e., no exposure)
$T_x$ % Transmittance in the activated state (time necessary to obtain maximum darkness when exposed to UV Hg lamp)

As shown from the above table, after 72 hours of light exposure, no photochromic effect is observed in Sample 3, coated with the comparative formulation of Ex. 3 with no stabilizer. Sample 2, coated with the comparative formulation of Ex. 2 (using TINUVIN 770), exhibited opacification due to crystallization of the stabilizer. The non-grafted stabilizer (TINUVIN 770), after 72 hours of light exposure, was observed to migrate to, and crystallize on, the surface of the samples. Measurements by differential thermal analysis showed a melting point of about 85° C. for the crystals, which is characteristic of this stabilizer.

As shown from the above experiments, the use of the inventive grafted (functionalized) stabilizer leads to improved photochromic performance after exposure to light, and also allows for the incorporation of a larger amount of stabilizer to the matrix without any significant detrimental effects on photochromicity since the grafted stabilizer does not migrate.

What is claimed is:

1. Photochromic organic material comprising a plastic substrate having formed thereon, a coating composition of a polymer matrix, said matrix having macromolecules and comprising a photochromic dye, and a hindered amine light stabilizer which is chemically bonded to the macromolecules of said polymer matrix.

2. The photochromic material of claim 1, wherein the polymer matrix comprises polyurethane.

3. The photochromic material of claim 1, wherein the composition further comprises a catalyst and a solvent.

4. The photochromic material of claim 1, wherein the photochromic dye is a spirooxazine.

5. The photochromic material of claim 1, wherein said coating has a thickness in the range of 5–150 microns.

6. The photochromic material of claim 5, wherein the coating is in the range of 10–50 microns.

7. The photochromic material of claim 1, wherein the plastic substrate is a lens made of polybis(allyl carbonate) of diethylene glycol.

8. Polymerizable coating composition that forms a stabilized photochromic polyurethane, wherein said polymerizable coating composition comprises as least one polyisocyanate; at least one polyol, the polyisocyanate-polyol pair being selected so that one of them presents one functional group more than the other; a photochromic dye of the spiroxazine class; a light stabilizer of a hindered amine type; and, optionally, a catalyst, characterized in that the hindered amine light stabilizer is functionalized with a group which is capable of reacting with the isocyanate to yield a polyurethane functionality.

9. Composition according to claim 8, characterized in that the hindered amine comprises a reactive hydroxyl group.

10. Composition according to claim 9, characterized in that the hindered amine is tetramethylpiperidinol.

11. Composition according to claim 9 or 10, characterized in that the polyisocyanate comprises three isocyanate groups, and the polyol is a diol.

12. Composition according to any one of claims 8–10, characterized in that the composition comprises, in wt %: 30–55 wt % of polyisocyanate, 20–35 wt % of polyol, 2–10 wt % of functionalized hindered amine light stabilizer, 0.1–2 wt % of photochromic dye, 0–2 wt % of catalyst, and 5–30 wt % of solvent.

13. Method for the production of a photochromic material as defined in claim 2, characterized in that said method comprises the steps of:
   a) selecting a substrate made of a transparent polymer material,
   b) applying a layer of a polymerizable composition as defined in any one of claims 8–10 to at least one of the sides of the substrate, and
   c) polymerizing said layer into a coating of photochromic polyurethane.

14. Photochromic organic material comprising a transparent plastic substrate having formed thereon a coating of photochromic matrix, said coating consisting essentially in weight percent of: 30–60 of polyisocyanate, 20–35 of polyol, 2–10 of a reactive light stabilizer functionalized with a group which is capable of reacting with the isocyanate to yield a polyurethane functionality, and 0.1–1.0 of photochromic dye.

15. Method of making a photochromic organic material by:
   a) providing a plastic substrate;
   b) combining to form a solution, polyisocyanate, polyol, a hindered amine light stabilizer having a group which is capable of reacting with isocyanate to form a urethane function, a spirooxazine, a catalyst, and a solvent; and
   c) applying a coating of the solution on at least one surface of said substrate.

16. The method of claim 15, further comprising the step of curing said substrate.

17. The method of claim 15, wherein the coating is characterized by a thickness in the range of 10–50 microns.

18. The method of claim 15, wherein the solution consists essentially, expressed in weight percent, of: 30–55 polyisocyanate, 20–35 polyol, 2–10 functionalized or reactive stabilizer, 0.1–2.0 photochromic dye, 0–2 catalyst, and 5–30 solvent.

* * * * *